United States Patent
Tajima et al.

(10) Patent No.: US 11,726,691 B2
(45) Date of Patent: Aug. 15, 2023

(54) COMPUTER SYSTEM AND COMMUNICATION MANAGEMENT METHOD

(71) Applicant: Hitachi, Ltd., Tokyo (JP)

(72) Inventors: Sachie Tajima, Tokyo (JP); Takahiro Yamamoto, Tokyo (JP); Shintaro Ito, Tokyo (JP); Masakuni Agetsuma, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 57 days.

(21) Appl. No.: 17/468,850

(22) Filed: Sep. 8, 2021

(65) Prior Publication Data
US 2022/0244875 A1 Aug. 4, 2022

(30) Foreign Application Priority Data

Feb. 4, 2021 (JP) .................... 2021-016960

(51) Int. Cl.
*G06F 3/06* (2006.01)
*G06F 13/10* (2006.01)

(52) U.S. Cl.
CPC .......... *G06F 3/0646* (2013.01); *G06F 3/0613* (2013.01); *G06F 3/0683* (2013.01); *G06F 13/102* (2013.01)

(58) Field of Classification Search
None
See application file for complete search history.

(56) References Cited

U.S. PATENT DOCUMENTS

2009/0024812 A1* 1/2009 Boyd .................. G06F 11/2058
  711/E12.103
2010/0088335 A1* 4/2010 Mimatsu ............. H04L 67/1097
  707/E17.032

FOREIGN PATENT DOCUMENTS

JP          H9-62499 A       3/1997

* cited by examiner

*Primary Examiner* — Idriss N Alrobaye
*Assistant Examiner* — Dayton Lewis-Taylor
(74) *Attorney, Agent, or Firm* — Baker Botts L.L.P.

(57) ABSTRACT

When a communication protocol is changed, the I/O function can be appropriately provided. In a computer system, a storage node includes a CPU and a storage control program that performs communication relating to data I/O. The storage control program has a first storage control program that is capable of using a first communication protocol, and a second storage control program that is capable of using the first communication protocol and a second communication protocol. The control node the control node causes, when any storage node of the plurality of storage nodes is capable of executing the first storage control program alone, all storage nodes to perform communication using the first communication protocol. The control node causes, after all storage nodes of the plurality of storage nodes are enabled to execute the second storage control program, the all storage nodes to perform communication using the second communication protocol.

10 Claims, 10 Drawing Sheets

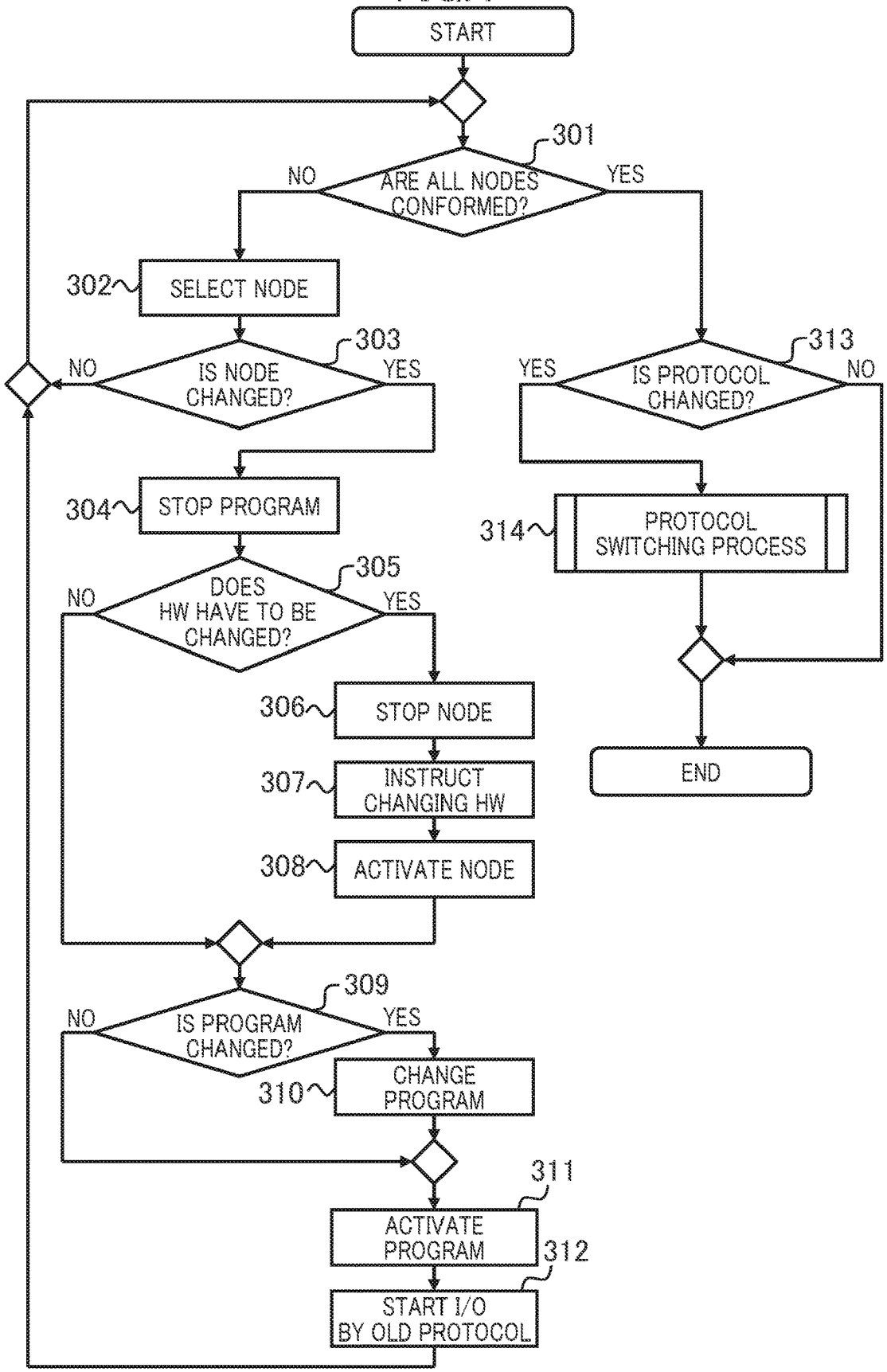

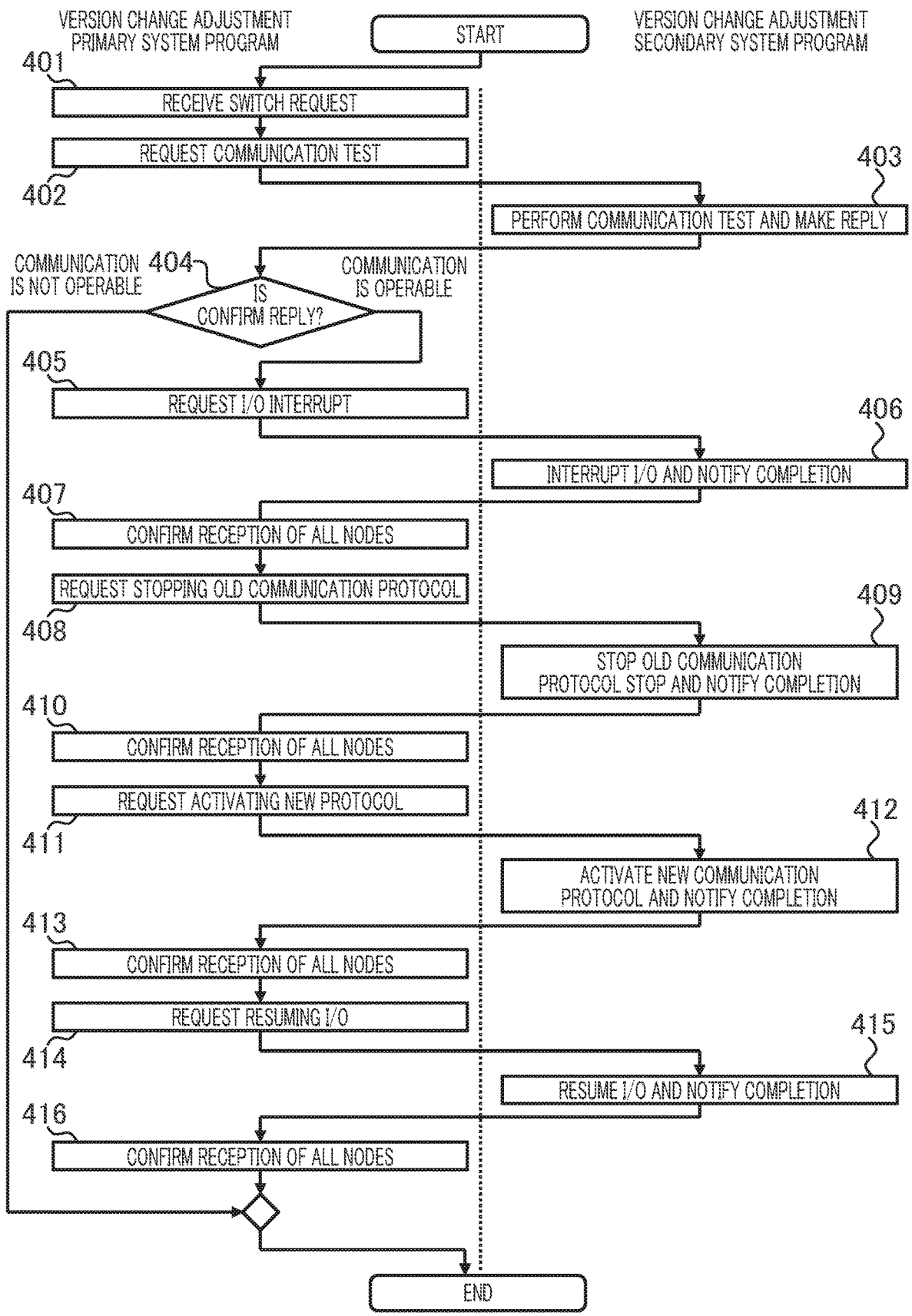

FIG.6

STORAGE CONTROL PROGRAM VERSION MANAGEMENT

■ PRESENT VERSION 1.0.2

■ CHANGEABLE VERSION

| SELECT | VERSION |
|--------|---------|
| ○ | 1.0.2 |
| ○ | 1.0.3 |
| ● | 1.1.0 |

■ OPERABLE VERSION

| SELECT | ITEM |
|--------|------|
| ☑ | CHANGE COMMUNICATION PROTOCOL BETWEEN COMPUTE NODE AND STORAGE NODE FROM TCP TO RDMA |
| ☑ | CHANGE COMMUNICATION PROTOCOL BETWEEN STORAGES FROM TCP TO RDMA |
| ☐ | CHANGE COMMUNICATION PROTOCOL BETWEEN COMPUTE NODE AND STORAGE NODE FROM RDMA TO TCP |
| ☐ | CHANGE COMMUNICATION PROTOCOL BETWEEN STORAGES FROM RDMA TO TCP |

[ CHANGE VERSION ]   [ CLOSE ]

COMPUTER SYSTEM AND COMMUNICATION MANAGEMENT METHOD

BACKGROUND

The present invention relates to a computer system, for example, that manages changes in communication protocols.

It is known that computer systems are equipped with a storage device or a storage system (also referred to simply as a storage) that manages user data. In the storage of such a computer system, it is necessary to continue to provide I/O functions unless there is an explicit stop instruction from a user. On the other hand, the storage control program that runs in the storage and implements I/O may require additional functions or functional modifications. Therefore, it is necessary to make the storage control program changeable while I/O functions is continually provided to the user.

For example, in the technique described in Japanese Unexamined Patent Application Publication No. Hei9 (1997)-62499, when a control microprogram is changed, some processors in a plurality of processors having the same path in the storage device are blocked, and the control microprogram running on the blocked processors is changed. While the control microprograms running on some of the processors are stopped, the control microprograms on the remaining processors continue to run and continue to provide I/O functions to the user. This kind of change of control microprograms in the storage device is performed to control microprograms running on all processors in the storage device. This enables the change of control microprograms while I/O functions are continuously provided.

There is known a Software Defined Storage (SDS) having its storage configured of a plurality of nodes. In the SDS, it is necessary to communicate between nodes. As a communication protocol to implement communication between nodes, TCP/IP has long been used. On the other hand, nowadays, Remote Direct Memory Access (RDMA) becomes popular as a communication protocol.

SUMMARY

Although TCP/IP and RDMA both implement communication between nodes, there are differences in performance. The communication protocol used by the storage control program running in the SDS is changed to another communication protocol, it is sometimes possible to benefit from improved I/O performance, for example.

With the change of the storage control program of the nodes in the SDS, the communication protocol used by the nodes can be changed. However, for example, in the case in which the storage control programs of some nodes are changed to use a new communication protocol and the storage control programs of the remaining nodes are not changed and use the old communication protocol, communication using the old and new communication protocols are mixed. Communication between different communication protocols is not possible, and communication between the nodes that constitute the SDS fails, which results in making providing I/O functions infeasible.

The present invention is made in view of the circumstances, and an object of the present invention is to provide a technique that can properly provide I/O functions when the communication protocol is changed.

In order to achieve the object, a computer system according to an aspect is a computer system including a plurality of storage nodes constituting a storage that manages data and a control node. The plurality of storage nodes includes a processor, and a storage control program executed by the processor, the storage control program performing communication relating to data I/O between a compute node and another storage node. The control node causes, when any storage node of the plurality of storage nodes is capable of executing the first storage control program alone, all storage nodes to perform communication using the first communication protocol. The control node causes, after all storage nodes of the plurality of storage nodes are enabled to execute the second storage control program, the all storage nodes to perform communication using the second communication protocol.

According to the present invention, I/O functions can be provided appropriately when a communication protocol is changed.

BRIEF DESCRIPTION OF THE DRAWINGS

FIG. 4 is a flowchart of a storage control program change process according to the first embodiment.

FIG. 5 is a flowchart of a protocol switching process according to the first embodiment.

FIG. 6 is an example showing a storage control program version management screen according to the first embodiment.

DETAILED DESCRIPTION

Embodiments will be described with reference to the drawings. The embodiments described below do not limit the invention to the claims, and all of the elements and combinations of elements described in the embodiments are not necessarily required to the solution of the invention.

In the following description, processing is sometimes described with a "program" as an operating entity. however, since a processor (e.g., CPU (Central Processing Unit)) executes the program to perform a predetermined process using storage unit (e.g. a memory) and/or an interface device, for example, the entity of processing may be a processor (or a device or system having the processor). The processor may also include hardware circuits that perform a part or all of the processing. The program may be installed on a device such as a computer from a program source. The program source may be, for example, a storage medium readable by a program distribution server or by a computer. In the following description, two or more programs may be implemented as one program, or one program may be implemented as two or more programs.

Figure 1:
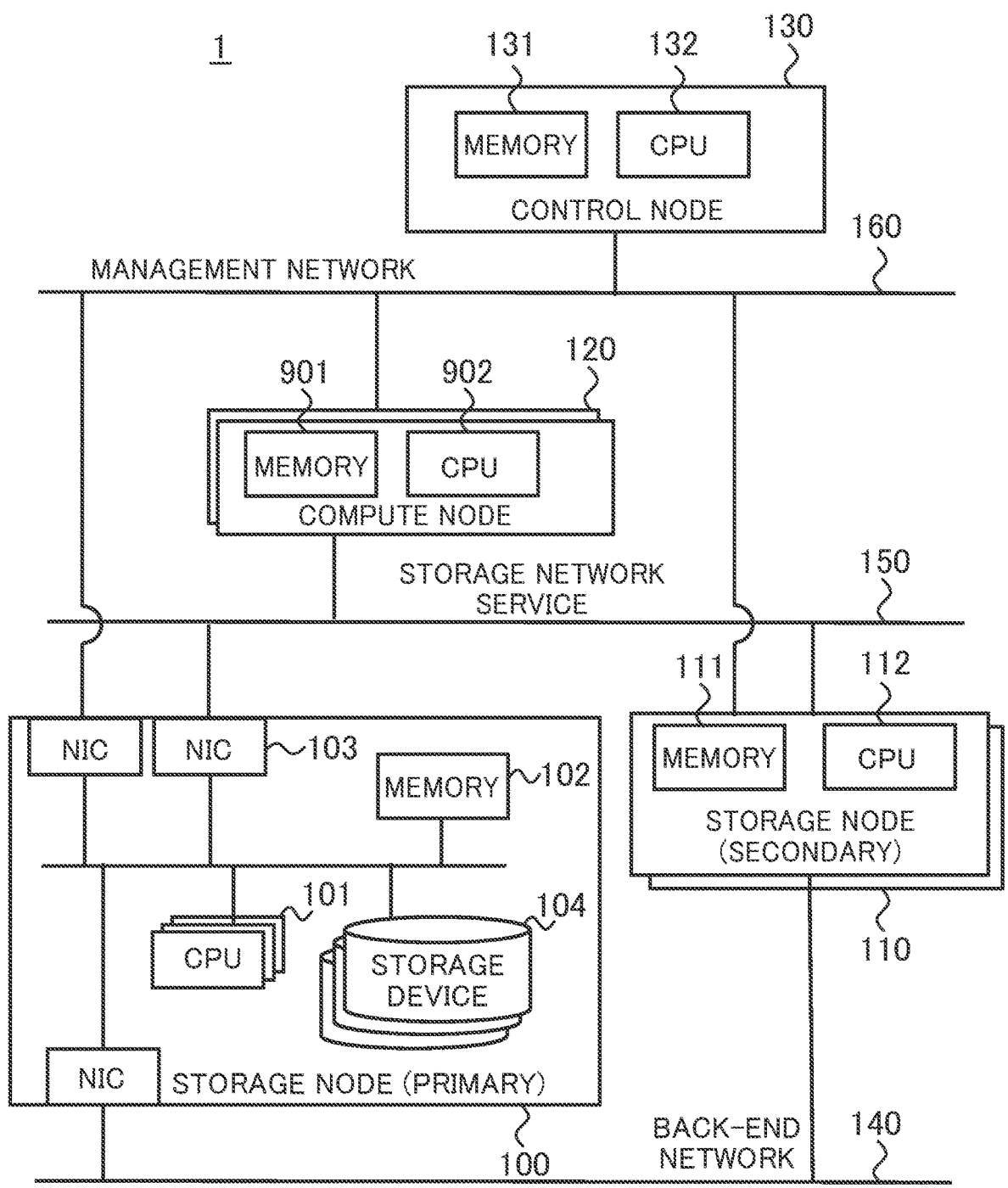
FIG. 1 is an overall block diagram of a computer system according to a first embodiment.

FIG. 1 is an overall block diagram of a computer system according to a first embodiment.

A computer system 1 includes one storage node 100 (a primary), one or more storage nodes 110 (a secondary), one or more compute nodes 120, one control node 130, a backend network 140, a storage service network 150, and a management network 160. The backend network 140 connects the nodes of storage nodes 100 and 110 to each other. The storage service network 150 connects the storage nodes 100 and 110 to the compute nodes 120. The management network 160 connects the control node 130, the compute node 120, and the storage nodes 100 and 110 to one another. The backend network 140, the storage service network 150, and the management network 160 may be on a part or all of the same network. In the present embodiment, an SDS is constituted of a plurality of storage nodes 100 and 110.

The storage node 100 is a node that serves as a primary in the SDS and has a CPU 101 as an example of one or more processors, a memory 102, a network interface card (NIC) 103 as an example of one or more communication interfaces, and one or more storage devices 104.

The NIC 103 is an interface, for example, a wired LAN card or a wireless LAN card, which communicates with other devices via a network (140, 150, and 160). The NIC 103 has a fixed number of communication protocols that the NIC 103 can support.

The CPU 101 executes various processes according to a program stored in the memory 102 and/or the storage device 104.

The memory 102 is, for example, a RAM (RANDOM ACCESS MEMORY) and stores a program executed by the CPU 101 and necessary information.

The storage device 104 is, for example, a hard disk or flash memory, and stores programs executed by the CPU 101, data used by the CPU 101, and data (user data) used by the compute nodes 120.

The storage node 110 is a node that serves as a secondary, and has, for example, one or more CPUs 112, a memory 111, one or more NICs (not shown), and one or more storage devices (not shown).

The CPU 112 executes various processes according to programs stored in the memory 111 and/or storage device. The memory 111 is, for example, a RAM, and stores a program executed by the CPU 112 and necessary information.

The storage node 100 and the storage node 110 may have an identical configuration, and settings may determine which node is the primary.

The control node 130 is a computer used by the administrator of the computer system 1 (an example of a user) to manage the storage nodes 100 and 110, and the compute node 120, and has a memory 131, a CPU 132, and an NIC, not shown. The administrator may use the control node 130 directly, or may use the control node 130 using the compute node 120.

The CPU 132 executes various processes according to a program stored in the memory 131. The memory 131 is, for example, a RAM, and stores a program executed by the CPU 132 and necessary information.

The compute node 120 is a computer that is used by the user, that performs processing desired by the user, and that performs I/O to the SDS for user data involved in the processing, and the compute node 120 has a memory 901, a CPU 902, and an NIC, not shown.

The CPU 902 executes various processes according to a program stored in the memory 901. The memory 901 is, for example, a RAM, and stores a program executed by the CPU 902 and necessary information. The compute node 120 performs I/O to the storage devices 104, for example, in the storage nodes 100 and 110 that constitute the SDS by iSCSI or NVMe over Fablic via the storage service network 150.

Figure 2:
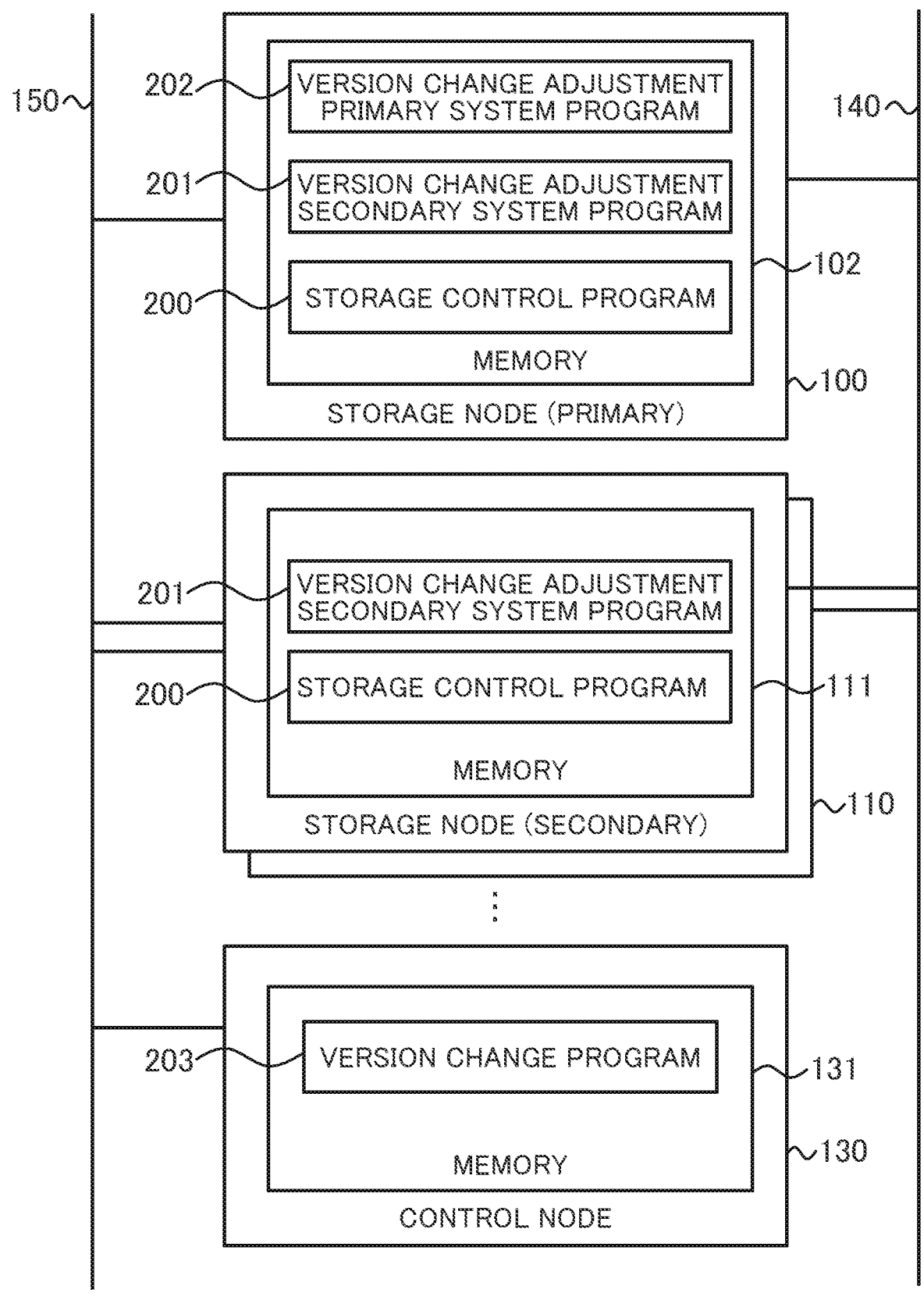
FIG. 2 is a block diagram of the memories of a control node and storage nodes according to the first embodiment.

FIG. 2 is a block diagram of the memory of the control node and the storage node according to the first embodiment.

The memory 131 of the control node 130 stores a version change program 203 that executes the processing of the control node 130 in a storage control program change process (see FIG. 4) described below.

The memory 102 of the storage node 100 stores a storage processing program 200 that executes I/O-related processing, a version change adjustment primary system program 202 that executes processing on the main side of a protocol switching process (see FIGS. 5 and 8) described below, and a version change adjustment secondary system program 201 that executes processing on the secondary side of the protocol switching process.

The memory 111 of the storage node 110 stores the storage processing program 200 that executes I/O-related processing, and the version change adjustment secondary system program 201 that executes processing on the secondary side of the protocol switching process.

Figure 3:
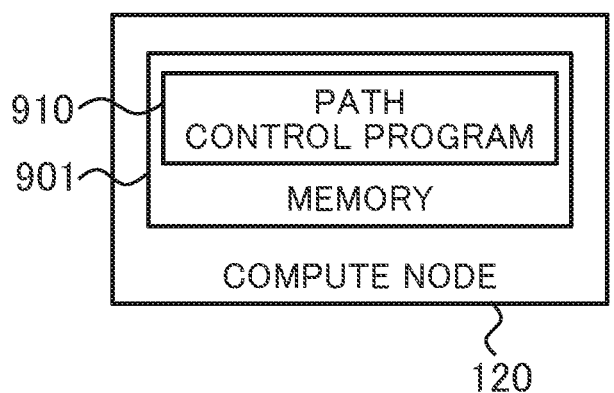
FIG. 3 is a block diagram of the memory of a compute node according to the first embodiment.

FIG. 3 is a block diagram of the memory of the compute node according to the first embodiment.

The memory 901 of the compute node 120 stores a path control program 910 that executes the process of controlling paths between the compute node 120 and the storage nodes 100 and 110.

Subsequently, the storage control program change process in computer system 1 will be described.

FIG. 4 is a flowchart of the storage control program change process according to the first embodiment.

The storage control program change process is executed when the version change program 203 of the control node 130 (strictly speaking, the CPU 132 executing the version change program 203 of the control node 130) receives a version change request from the administrator. The version change request includes, for example, the version of the storage control program 200 to be changed, a communication protocol to be changed, and the specification of a network for changing the communication protocol. The following process assumes that the version change request includes, for example, a specification to change the storage control program 200 to the latest version.

The version change program 203 (strictly speaking, the CPU 132 executing the version change program 203) confirms whether the processes of Steps 302 to 312 have been performed for all the storage nodes 100 and 110 constituting the SDS of the computer system 1 (Step 301).

As a result, in the case in which there are unimplemented storage nodes 100 and 110 (Step 301: No), the version change program 203 selects one storage node from the unimplemented storage nodes (Step 302). Here, in the description of this process, the selected storage node is referred to as a selected storage node.

Subsequently, the version change program 203 confirms whether the storage control program 200 or the NIC installed in the selected storage node have to be changed (Step 303). Specifically, in the case in which the version of the storage control program 200 does not match the version of the storage control program to be changed, which is included in the version change request, or in the case in which the NIC mounted on the selected storage node does not support the communication protocol used by the storage control program to be changed, which is included in the version change request, the version change program 203 determines that it is necessary to change the version of the storage control program 200.

As a result, in the case in which it is determined that no change is necessary (Step 303: No), the version change program 203 proceeds to Step 301, while in the case in which it is determined that change is necessary (Step 303: Yes), the version change program 203 stops the storage control program 200 running on the selected storage node (Step 304).

Subsequently, the version change program 203 confirms whether the NIC installed in the selected storage node supports the communication protocol of the storage control program to be changed, which is included in the version change request, and determines whether the hardware (NIC) has to be changed (Step 305). Here, in the case in which the NIC does not support the communication protocol of the storage control program to be changed, which is included in the version change request, the version change program 203 determines that the hardware has to be changed.

As a result, in the case in which it is determined that hardware change is necessary (Step 305: Yes), the version change program 203 stops the selected storage node (Step 306) and issues an instruction to the user (administrator) for hardware change (Step 307). In the present embodiment, the version change program 203 outputs, for example, an NIC change screen 600 shown in FIG. 7. This allows the user to properly recognize that the NIC has to be changed.

Subsequently, upon receiving a response notification from the user to a hardware change instruction, the version change program 203 activates the selected storage node once it receives (Step 308).

On the other hand, in the case in which it is determined in Step 305 that hardware change is unnecessary (Step 305: No), or after executing Step 308, the version change program 203 determines whether program change is necessary by confirming whether the version of the storage control program running on the selected storage node matches the version of the storage control program to be changed, which is included in the version change request (Step 309). Here, the version change program 203 determines that a program change is necessary when the versions do not match.

As a result, in the case in which it is determined that a program change is necessary (Step 309: Yes), the version change program 203 changes the storage control program (first storage control program) that has been running on the selected storage node to the program control program of the version change request (second storage control program) (Step 310). For example, the second storage control program is a newer version of the program than the first storage control program, and is capable of using at least the communication protocol that the first storage control program is capable of using (first communication protocol).

On the other hand, in the case in which it is determined in Step 309 that program change is not necessary (Step 309: No), or after performing Step 310, the version change program 203 activates the storage control program (Step 311). As a result, the activated storage control program resumes I/O of the selected storage node using the communication protocol (first communication protocol) that has been used by the storage control program before stopped in Step 304 (Step 312). This allows the selected storage nodes to communicate properly using the first communication protocol.

After Step 312, the storage control program change process returns to Step 301.

On the other hand, in Step 301, in the case in which there are no storage nodes 100 and 110 that have not yet been implemented, i.e., the processes in Steps 302 to 312 are already executed for all the storage nodes (Step 301: Yes), the version change program 203 confirms whether the communication protocol used by the storage control program 200 of all the storage nodes matches the communication protocol to be changed included in the version change request, and determines whether the communication protocols of the storage nodes have to be changed (Step 313). Here, in the case in which the communication protocols do not match, the version change program 203 determines that the protocol has to be changed.

As a result, in the case in which it is determined that the protocol has to be changed (Step 313: Yes), the version change program 203 causes the storage nodes 100 and 110 to execute the protocol switching process (see FIGS. 5 and 8) (Step 314), and ends the storage control program change process. In the present embodiment, the version change program 203 sends a protocol switching request to the storage node 100, and causes the protocol switching process to be executed. The protocol switching request includes, for example, the communication protocol to be changed and the specification of the network in which the communication protocol is to be changed.

On the other hand, in the case in which it is determined that the protocol does not have to be changed (Step 313: No), the version change program 203 ends the storage control program change process.

Here, the storage control program change process described above can also be used to change one communication protocol to another without involving the change of the storage control program version. For example, in the case in which the storage control program running on all the storage nodes supports the use of a plurality of communication protocols, when a request to change the communication protocol is received, in the storage control program change process described above, it is necessary to determine that no change is necessary in Step 303 for each storage node. in the case in which the confirmation of all nodes has been completed (Step 301: Yes), Steps 313 and 314 only have to be implemented.

According to this process, a communication protocol can be appropriately changed to another communication protocol.

Next, the protocol switching process (Step 314) is described in detail.

FIG. 5 is a flowchart of the protocol switching process according to the first embodiment. FIG. 5 shows the process in the case in which as a protocol switching request, for example, a request to switch the communication protocol for the backend network 140 is included.

The version change adjustment primary system program 202 of the storage node 100 (strictly speaking, the CPU 101 of the storage node 100 executing the version change adjustment primary system program 202) receives a protocol switching request from the version change program 203 of the control node 130 (Step 401). Here, the protocol switching request includes information on the type of network to be changed (change target network) and the communication protocol to be changed (requested communication protocol: new communication protocol).

The version change adjustment primary system program 202 determines whether the change target network can communicate using the requested communication protocol, and in the case in which communication is feasible, the version change adjustment primary system program 202 sends information on the change target network and the requested communication protocol to the version change adjustment secondary system program 201 of all the storage nodes (including its own storage nodes) that constitute the SDS of the computer system 1, and sends a communication test request using the requested communication protocol in the change target network (Step 402).

The version change adjustment secondary system program 201 of each storage node receives a communication test request from the version change adjustment primary system program 202 and executes the communication test corresponding to the communication test request. in the case in which the change target network in the communication test request is the backend network 140, the test is performed on the storage node 100 whether communication using the requested communication protocol is possible. in the case in which the change target network is the storage service network 150, a test is performed on the compute node 120 whether communication using the request communication protocol is possible. in the case in which the change target network is the management network 160, a test is performed on the control node 130 whether communication with the request communication protocol is possible. The test results are returned to the version change adjustment primary system program 202 (Step 403).

The version change adjustment primary system program 202 receives the test results from all the storage nodes that have sent the communication test request, and confirms the test results (Step 404). As a result, in the case in which the test result of one or more storage nodes is communication failure (Step 404: communication failure exists), the version change adjustment primary system program 202 ends the protocol switching process. In this case, the storage control program 200 of all the storage nodes is to communicate using the communication protocol before the change.

On the other hand, in the case in which the test results of all the storage nodes show that communication is possible (Step 404: No communication failure), the version change adjustment primary system program 202 sends an I/O interruption request to the version change adjustment secondary system program 201 of all the storage nodes requesting the interruption of communication regarding data I/O (Step 405). The processes after this step will be described using the case in which the change target network is the backend network 140 as an example.

The version change adjustment secondary system program 201 that receives the I/O interruption request immediately interrupts the I/O of the storage control program 200 running in its own storage node, and upon confirming the I/O interruption, sends an I/O interruption completion notification to the version change adjustment primary system program 202 notifying that the I/O interruption has been completed (Step 406). in the case in which the version change adjustment secondary system program 201 receives a request to suspend I/O, I/O may be suspended after completion of the processing of I/O requests that have already been received.

upon confirming the I/O interruption completion notification from all the storage nodes (Step 407), the version change adjustment primary system program 202 sends, to the version change adjustment secondary system program 201 of all the storage nodes, a request to stop the present communication protocol (old communication protocol: first communication protocol) in the change target network (backend network 140 in this example) including information on the change target network (Step 408).

After receiving the request to stop the old communication protocol, the version change adjustment secondary system program 201 stops the communication protocol used in the change target network by the storage control program 200, and after confirming that the communication protocol has been stopped, the version change adjustment secondary system program 201 sends a stop completion notification to the version change adjustment primary system program 202 (Step 409).

The version change adjustment primary system program 202 confirms that it has received the stop completion notification from all the storage nodes (Step 410), and sends a request to the version change adjustment secondary system program 201 of all the storage nodes to activate the new communication protocol by notifying the change target network and the requested communication protocol (new communication protocol: the second communication protocol) (Step 411). 2 communication protocol) and send a request to activate the new communication protocol (new communication protocol activation request) (Step 411).

Upon receiving the request to start the new communication protocol, the version change adjustment secondary system program 202 activates the new communication protocol as the communication protocol to be used in the change target network by the storage control program 200. When the activation of the new communication protocol is completed, the version change adjustment secondary system program 202 notifies the primary system program 202 of the completion of the activation of the new communication protocol (new communication protocol activation completion notification) (Step 412).

The version change adjustment primary system program 202 confirms that the new communication protocol startup completion notification has been received from all the storage nodes (Step 413), and sends a request to resume I/O (I/O resume request) to the version change adjustment secondary system program 201 of all the storage nodes (Step 414).

The version change adjustment secondary system program 201 that receives the I/O restart request resumes the I/O of the storage control program 200 running in its own storage node, and when the I/O is resumed, the version change adjustment secondary system program 201 sends a notification that the I/O restart has been completed (I/O restart completion notification) to the version change adjustment primary system program 202 (Step 415).

The version change adjustment primary system program 202 confirms that the I/O restart completion notification has been received from all the storage nodes (Step 416), and ends the protocol switching process.

In the protocol switching process, when no irregular failure occurs, the time from the I/O interruption in Step 406 to the restart of I/O in Step 415 is implemented such that the time is shorter than the time when the I/O request issued from the compute node 120 times out, and thus the communication protocol can be changed without causing errors due to timeouts in I/O requests issued from the compute node 120. In particular, before changing the communication protocols of all the storage nodes, communication tests are performed on each storage node to confirm that the communication protocols can be used, and thus the possibility of errors occurring in I/O requests issued by the compute nodes 120 can be effectively reduced.

As described above, according to the computer system according to the present embodiment, the communication protocol can be changed while I/O functions are appropriately provided.

Next, the storage control program version management screen will be described, which is displayed on the control node 130 or the compute node 120 using the control node 130.

FIG. 6 is a diagram showing an example of the storage control program version management screen according to the first embodiment.

A storage control program version management screen 500 is a screen that displays the present version of the storage control program 200 in the computer system 1 and the version of the storage control program, which is changeable, and that sends a version change request.

The storage control program version management screen 500 displays a present version display region 510, a changeable version display region 520, a version change button 541, and a close button 542.

The present version display region 510 displays the version of the storage control program 200 that is presently running on the computer system 1.

The version of the storage control program 200 that can be changed in the computer system 1 is selectably displayed in the changeable version display region 520. Specifically, the changeable version display region 520 shows a version information display region 522 that displays information on changeable versions, and radio buttons 521 that are disposed at positions corresponding to each changeable version and are used to select the radio buttons 521 as the version to be changed.

The version information display region 522 shows an item content display region 532 that displays the content of items, which can be implemented by changing the version, and a confirm box 531 that selects the implementation of the item. For items that can be implemented, any number of items can be selected by confirming a confirm box 531. In the present embodiment, examples of items that can be implemented include the network for which the communication protocol is to be changed and the contents of the change in the communication protocol.

The version change button 541, when pressed, changes the version to the version selected by the radio button 521 in the changeable version display region 520 and inputs, or sends, to the control node 130, a version change request requesting the implementation of the item confirmed against the confirm box 531. As a result, the control node 130 is to execute the storage control program change process.

The close button 542, when pressed, closes the storage control program version management screen 500.

Next, the NIC change screen 600 displayed in Step 307 of the storage control program change process will be described.

Figure 7:
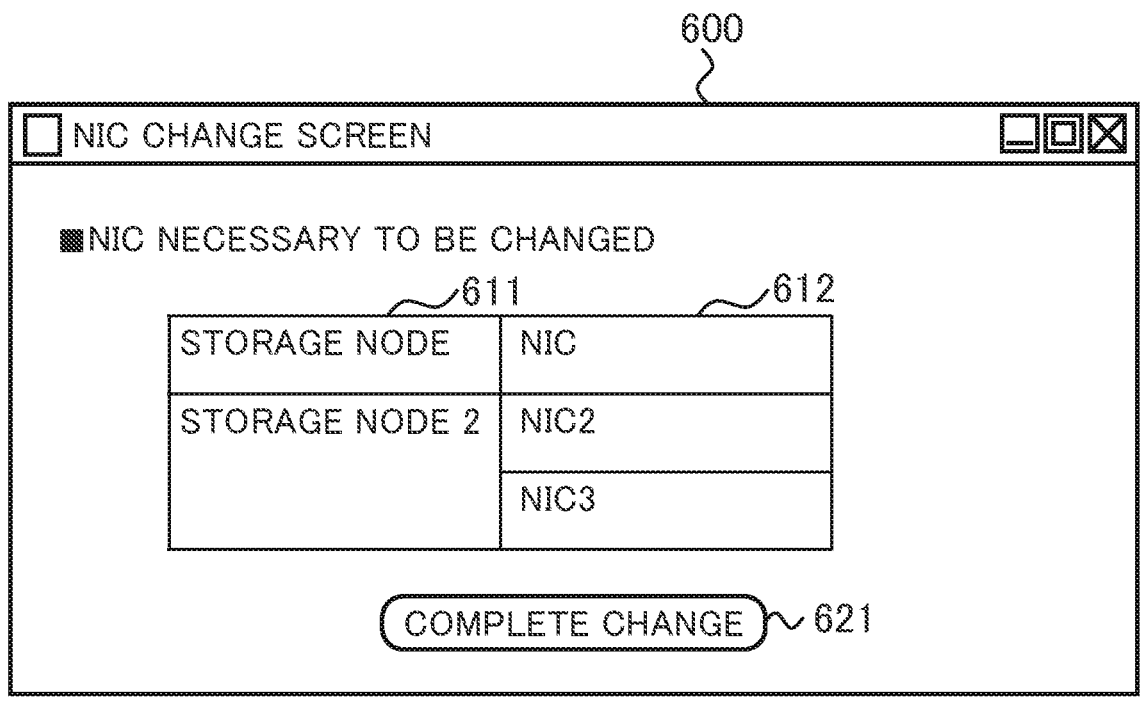
FIG. 7 is an example showing an NIC change screen according to the first embodiment.

FIG. 7 is an example showing the NIC change screen according to the first embodiment.

The NIC change screen 600 is a screen that instructs the user to change the NIC, and includes a change required storage node display column 611, a change required NIC display column 612, and a change completion button 621.

The name of the storage node on which the NIC that has to be changed is installed is displayed in the change required storage node display column 611. The identification number of the NIC that has to be changed is displayed in the change required NIC display column 612. The change completion button 621 is a button that is pressed when the user has changed the NIC that has to be changed. When the change completion button 621 is pressed, a response notification for the hardware change instruction is sent to the control node 130.

Next, the protocol switching process (Step 314 in FIG. 4) in the case in which the protocol change request is a request to change the communication protocol used in the storage service network 150 will be described.

Figure 8:
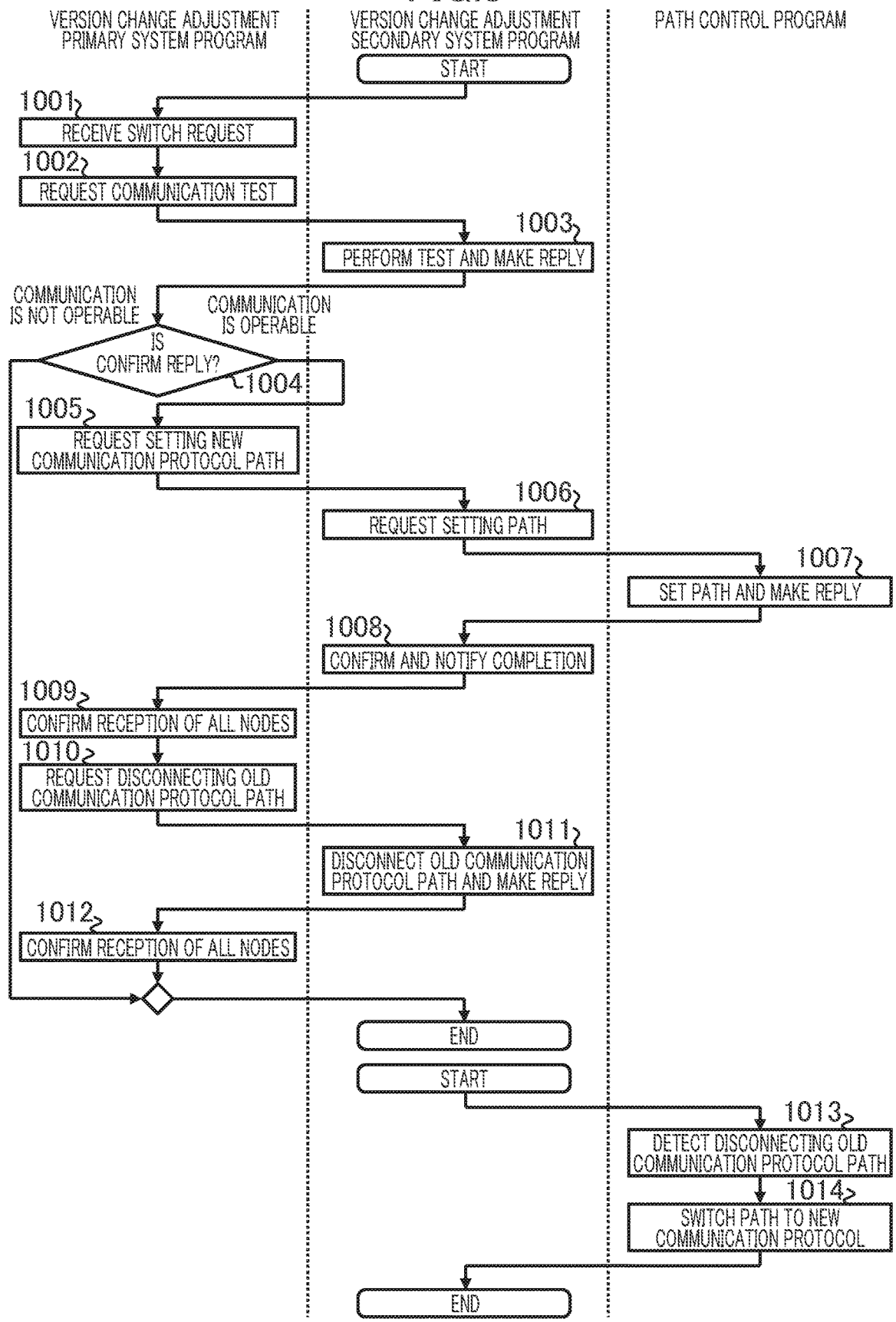
FIG. 8 is a flowchart of a protocol switching process for a storage service network according to the first embodiment.

FIG. 8 is a flowchart of the protocol switching process for the storage service network according to the first embodiment.

Steps 1001, 1002, 1003, and 1004 are the same as Steps 401, 402, 403, and 404 of the protocol switching process in FIG. 5.

The version change adjustment primary system program 202 receives the test results from all the storage nodes and confirms the test results (Step 1004). As a result, in the case in which the test result of one or more storage nodes is communication failure (Step 1004: communication failure exists), the version change adjustment primary system program 202 ends the protocol switching process. In this case, the storage control program 200 of all the storage nodes is to communicate using the communication protocol before the change (old communication protocol).

On the other hand, in the case in which the test results of all the storage nodes show that communication is possible (Step 1004: No communication failure), the version change adjustment primary system program 202 sends a request to the version change adjustment secondary system program 201 of all the storage nodes to set the path using the communication protocol of the change request destination (new communication protocol) (Step 1005).

The version change adjustment secondary system program 201 that has received the path setting request sends a path setting request to the path control program 910 of the compute node 120 (Step 1006).

The path control program 910 that has received the path setting request sets a path (communication path) for the change using the new communication protocol to the storage node (100 and 110) on which the version change adjustment secondary system program 201 of the sender operates, and sends a path setting completion notification to the version change adjustment secondary system program 201 of the sender (Step 1007). At the time of Step 1007, the compute node 120 and the storage nodes (100 and 110) are communicating with each other in the storage service network 150 using the old communication protocol for communication related to data I/O.

After receiving the path setting completion notification, the version change adjustment secondary system program 201 sends a path setting completion notification to the version change adjustment primary system program 202 (Step 1008).

upon confirming the path setting completion notification from all the storage nodes (Step 1009), the version change adjustment primary system program 202 sends a request for disconnecting the path using the old communication protocol (path disconnect request) to the version change adjustment secondary system program 201 of all the storage nodes (Step 1010).

Upon receiving the path disconnecting request, the version change adjustment secondary system program 201 disconnects the path using the old communication protocol in the storage service network 150 and sends a path setting completion notification indicating that the path has been cut to the version change adjustment primary system program 202 (Step 1011).

upon confirming the path setting completion notification of path disconnection from all the storage nodes (Step 1012), the version change adjustment primary system program 202 ends the protocol switching process.

After this, upon detecting that the path between the compute node 120 and the storage nodes (100 and 110) using the old communication protocol in the storage service network 150 has been disconnected (Step 1013), the path control program 910 of the compute node 120 switches the path to the alternate path using a new communication protocol, and communication is continued (Step 1014). This allows the communication between the compute nodes 120 and the storage nodes (100 and 110) in the storage service network 150 regarding data I/O to be properly changed to the new communication protocol.

Next, a computer system 1A according to a second embodiment will be described.

Figure 9:
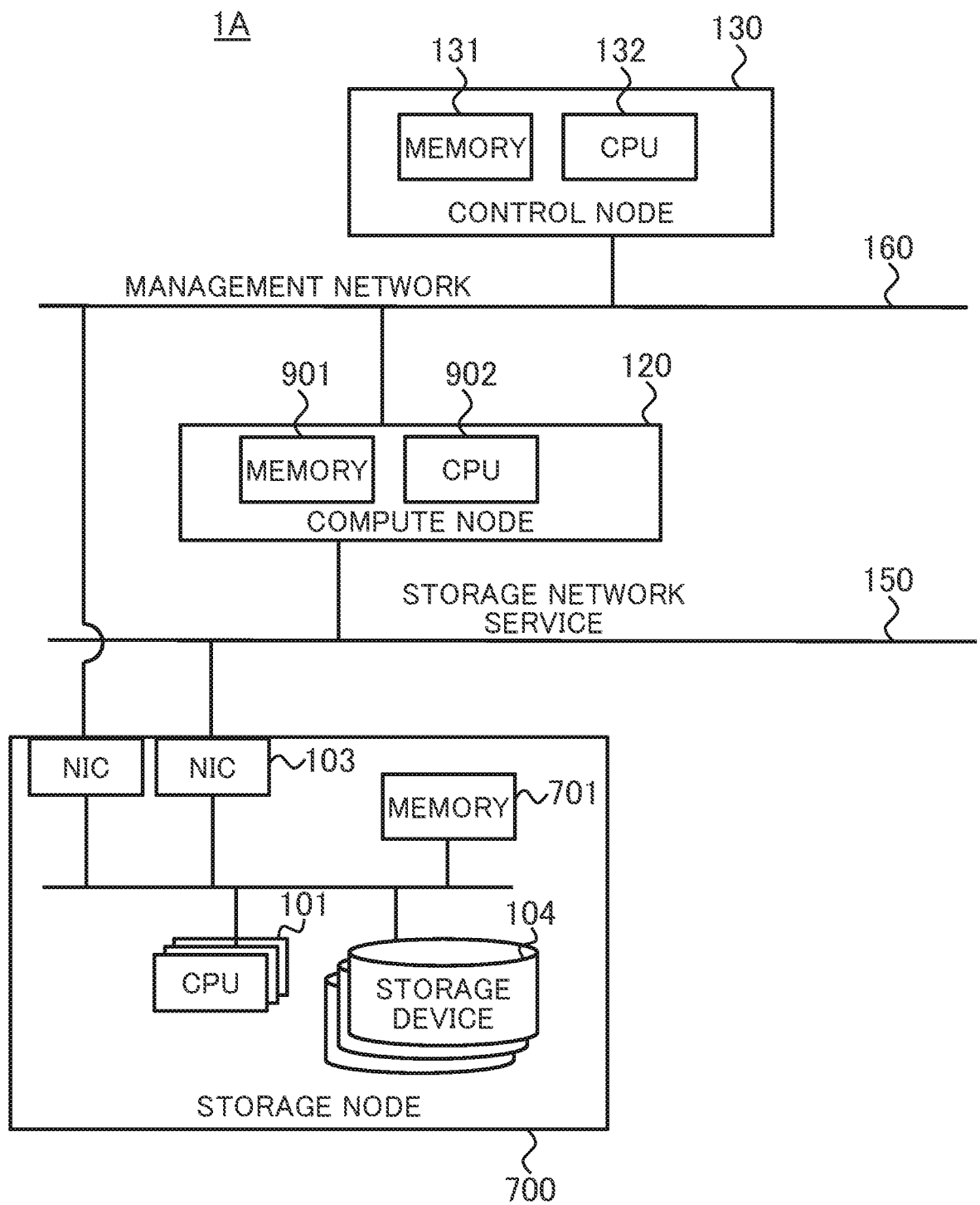
FIG. 9 is the overall block diagram of a computer system according to a second embodiment.

FIG. 9 is an overall block diagram of the computer system according to the second embodiment. In FIG. 9, the similar components to ones in the first computer system 1 are designated with the same reference signs, and duplicate descriptions are omitted.

In the computer system 1A according to the second embodiment, a plurality of virtual storage nodes is formed in a physical storage node 700. The computer system 1A has one storage node 700 and has no backend network 140. The control node 120 and the storage node 700 may be formed using a single physical node. In this case, the management network 160 is not present.

The storage node 700 has a CPU 101 as an example of a plurality of processors, a memory 701, an NIC 103 as an example of one or more communication interfaces, and one or more storage devices 104.

The memory 701 is, for example, a RAM, and stores a program executed by the CPU 101 and necessary information.

Figure 10:
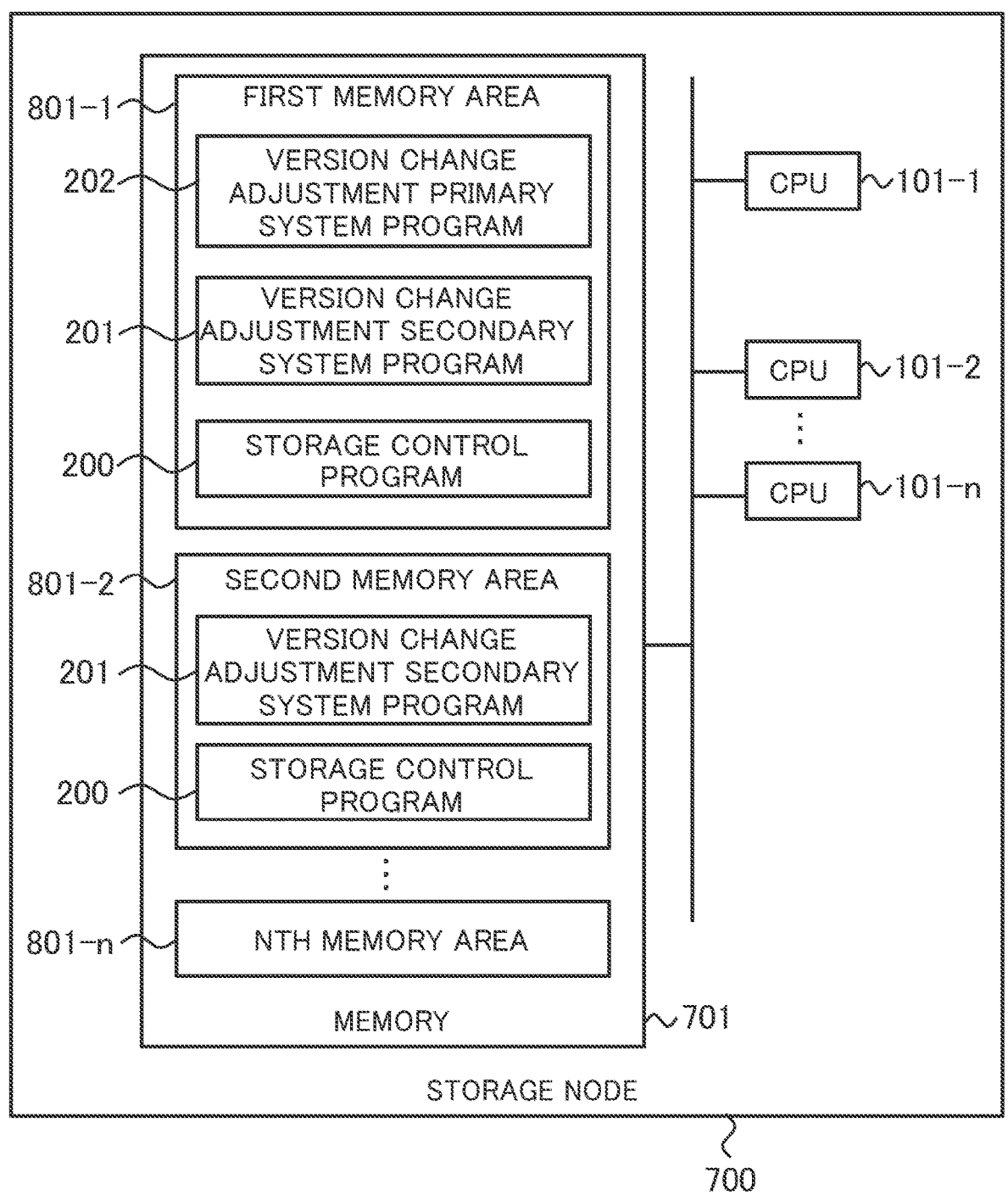
FIG. 10 is a block diagram of a memory of a storage node according to the second embodiment.

FIG. 10 is a block diagram of the memory of the storage node according to the second embodiment.

The memory 701 of the storage node 700 is divided into memory areas (a first memory area 801-1 to an nth memory area 801-n) for the number of CPUs (101-1 to 101-n: n is a natural number). A first memory area 801-1 has a storage control program 200, a version change adjustment secondary system program 201, and a version change adjustment primary system program 202. The memory areas from the second memory area 801-2 to the nth memory area 801-n have the storage control program 200 and the version change adjustment secondary system program 201.

The CPUs 101-1 to 101-n in the storage node 700 operate by occupying one of the memory areas. For example, the CPU 101-1 operates by occupying the first memory area 801-1, the CPU 101-2 operates by occupying the second memory area 801-2, and the CPU 101-n operates by occupying the nth memory area 801-n. As a result, programs in the first memory area 801-1 are executed by the CPU 101-1, programs in the second memory area 801-2 are executed by the CPU 101-2, and programs in the nth memory area 801-n are executed by the CPU 101-n. The configuration including the CPU and the memory area allocated to the CPU corresponds to the virtual storage node. The virtual storage node including the CPU 101-1 and the first memory area 801-1 is a primary virtual storage node, and the virtual storage node including another CPU and another memory area is a secondary virtual storage node. The SDS is constituted of the plurality of virtual storage nodes.

In the computer system 1A according to the second embodiment, the processing executed by each program of the physical storage node in FIG. 4 and FIG. 8 of the computer system 1 according to the first embodiment is the processing executed by the processing of the same name of the virtual storage node, and the content of the processing itself is the same.

According to the computer system 1A of the second embodiment, the communication protocol can be changed while I/O functions are appropriately provided even in the SDS constituted of a plurality of virtual storage nodes.

As described above, according to the computer system according to the present embodiment, the communication protocol can be changed while I/O functions are appropriately provided.

The present invention is not limited to the foregoing embodiments. however, the present invention can be implemented with appropriate modifications in a scope that does not deviate from the gist of the present invention.

For example, in the foregoing embodiments, at least a part of the processing of the version change adjustment primary system program 202 (e.g., FIGS. 5 and 8) may be performed by the control node 130.

A part or all of the processing that is performed by the CPU in the foregoing embodiments may be performed by dedicated hardware circuits. The program in the foregoing embodiments may be installed from a program source. The program source may be a program distribution server or a storage medium (e.g., a portable storage medium).

What is claimed is:

1. A computer system comprising:
a plurality of storage nodes constituting a storage that manages data;
a control node and
a secondary storage node,
wherein: the plurality of storage nodes includes
a processor, and
a storage control program executed by the processor, the storage control program performing communication relating to data I/O between a compute node and another storage node;
the storage control program has a first storage control program that is capable of using a first communication protocol, and
a second storage control program that is capable of using the first communication protocol and a second communication protocol;
the control node causes, when any storage node of the plurality of storage nodes is capable of executing the first storage control program alone, all storage nodes to perform communication using the first communication protocol; and
the control node causes, after all storage nodes of the plurality of storage nodes are enabled to execute the second storage control program, the all storage nodes to perform communication using the second communication protocol.

2. The computer system according to claim 1,
wherein:
a first storage node in the control node or the secondary storage node causes, after all storage nodes of the plurality of storage nodes are enabled to execute the second storage control program, the storage nodes to perform a communication test whether communication is feasible using the second communication protocol;
as a result of the communication test, when communication is feasible in all storage nodes using the second communication protocol, the first storage node causes the all storage nodes to perform communication using the second communication protocol; and
as a result of the communication test, when communication is not feasible in at least one storage node using the second communication protocol, the first storage node causes the all storage nodes to continue communication using the first communication protocol.

3. The computer system according to claim 2,
wherein as a result of the communication test, when communication is not feasible in at least one storage node using the second communication protocol, the first storage node in the control node or the secondary storage node notifies a user that the second communication protocol is not usable.

4. The computer system according to claim 1,
wherein the control node is capable of performing processing targeted for at least one communication of communication relating to data I/O with the compute node or communication relating to data I/O with another storage node.

5. The computer system according to claim 1,
wherein: when a communication protocol of communication relating to data I/O with another storage node is changed from the first communication protocol to the second communication protocol, a first storage node in the control node or the secondary storage node requests all storage nodes to interrupt communication relating to data I/O;
after confirming that communication relating to data I/O is interrupted in the all storage nodes, the first storage node requests the all storage nodes to stop the first communication protocol;
after confirming that the first communication protocol is stopped in the all storage nodes, the first storage node requests the all storage nodes to activate the second communication protocol; and
after confirming that the second communication protocol is started in the all storage nodes, the first storage node requests the all storage nodes to resume communication relating to data I/O.

6. The computer system according to claim 1,
wherein: the control node determines whether communication interfaces of the storage nodes support the second communication protocol;
when the communication interfaces do not support the second communication protocol, the control node notifies that a communication interface has to be changed.

7. The computer system according to claim 1, wherein the secondary storage node is a virtual node formed on a physical node.

8. The computer system according to claim 1,
wherein a first storage node in the control node or the secondary storage node creates, when a communication protocol for communication relating to data I/O between the secondary storage node and the compute node is changed from the first communication protocol to the second communication protocol, a path based on the second communication protocol between the compute node and the secondary storage node; and
the first storage node changes a path based on the first communication protocol to the path based on the second communication protocol, and changes to the second communication protocol.

9. A computer system comprising:
a plurality of storage nodes constituting a storage that manages data; and
a control node,
wherein: the plurality of storage nodes includes
a processor, and
a storage control program executed by the processor, the storage control program performing communication relating to data I/O between a compute node and another storage node;
the storage control program is a storage control program that is capable of using a first communication protocol and a second communication protocol; and
the control node causes, when an instruction to perform communication using the second communication protocol is issued to all storage nodes of the plurality of storage nodes, the all storage nodes to change communication using the second communication protocol;
wherein: a first storage node in the control node or a secondary storage node causes all storage nodes of the plurality of storage nodes to perform a communication test whether communication is feasible using the second communication protocol;
as a result of the communication test, when communication is feasible in the all storage nodes using the second communication protocol, the first storage node causes the all storage nodes to perform communication using the second communication protocol; and
as a result of the communication test, when communication is not feasible in at least one storage node using the second communication protocol, the first storage node causes the all storage nodes to continue communication using the first communication protocol.

10. A communication management method performed by a computer system including a plurality of storage nodes constituting a storage that manages data and a control node,
wherein: the plurality of storage nodes includes
a processor, and
a storage control program executed by the processor, the storage control program performing communication relating to data I/O between a compute node and another storage node;
the storage control program has
a first storage control program that is capable of using a first communication protocol, and
a second storage control program that is capable of using the first communication protocol and a second communication protocol;
the control node causes, when any storage node of the plurality of storage nodes is capable of executing the first storage control program alone, all storage nodes to perform communication using the first communication protocol; and
after all storage nodes of the plurality of storage nodes are enabled to execute the second storage control program, the control node causes the all storage nodes to perform communication using the second communication protocol.

* * * * *